United States Patent Office 2,799,700
Patented July 16, 1957

2,799,700

PROCESS FOR MAKING PURIFIED CYCLOHEXYLSULFAMATES

Earl W. Cummins, Elsmere, and Rayner S. Johnson, New Castle, Del., assignors to E. I. du Pont de Nemours and Company, Wilmington, Del., a corporation of Delaware No Drawing. Application July 20, 1954, Serial No. 444,666

1 Claim. (Cl. 260—500)

This invention relates to a process for making a food quality cyclohexylsulfamate by repeatedly extracting an impure cyclohexylsulfamate with a partly polychlorinated aliphatic hydrocarbon having no more than three carbon atoms.

Cyclohexylsulfamates are produced commercially by the reaction of cyclohexylamine with sulfamic acid or with chlorosulfonic acid. Products as thus produced contain impurities which are undesirable in food products. They contain, for example, such impurities as cyclohexylamine, cyclohexylammonium cyclohexylsulfamate, dicyclohexylsulfamide, and other unidentified organic materials.

According to the present invention, a product of high purity is made by the treatment of an aqueous solution of the cyclohexylsulfamate which it is desired to produce.

Cyclohexylsulfamates produced as by the reaction of cyclohexylamine with sulfamic acid or chlorosulfonic acid, and, in general, cyclohexylsulfamates which contain by-product impurities as above described can be treated according to the invention.

There may be treated such alkaline cyclohexylsulfamates as the alkali cyclohexylsulfamates, sodium, potassium, and lithium cyclohexylsulfamates and such alkaline earth metal cyclohexylsulfamates as calcium, barium, and magnesium cyclohexylsulfamates.

The cyclohexylsulfamate is first made in the form of an aqueous solution containing from about 30 to 50 percent by weight of the cyclohexylsulfamate.

Somewhat elevated temperatures are preferably used since, as with calcium, the cyclohexylsulfamate is not soluble in the preferred concentrations at low temperatures. Generally, for example, with the calcium salt the temperature should be above 40° C. and is preferably between 40 and 70° C. To avoid the necessity for using pressure it is more specifically preferred that the calcium cyclohexylsulfamate concentration be from 30 to 40 percent by weight and the temperature from 40 to 55° C. Other salts similarly will be heated to an appropriate temperature to permit the preparation and subsequent extraction of an aqueous solution containing from 30 to 50 percent by weight of the salt.

The aqueous solution is extracted with a partly polychlorinated aliphatic hydrocarbon having no more than three carbon atoms. Such hydrocarbons include chloroform, methylene chloride, ethylene dichloride, tri-chloroethylene, 1,2-dichloropropane, 1,1,2-trichloroethane. It is of course noted of the methylene chloride that it is so volatile that it should be used under pressure, and it is not preferred for this reason. It is noted that with many of the solvents, pressure may be required at relatively higher temperatures to prevent excessive volatilization. For example, a chloroform-water azeotrope boils at 56° C. and if higher temperatures are to be used then of course pressure must be employed. Ordinarily, it will be desirable to operate below temperatures which require pressure for the particular system.

The pH of the aqueous system may vary from, say, 6 and 12, but it will ordinarily be preferred to adjust the pH to between 8 and 12. The pH adjustment can be effected with a suitable base, such as the base of the salt corresponding to the particular cyclohexylsulfamate being treated or with sulfuric, hydrochloric, or cyclohexylsulfamic acid.

The extraction will be effected repeatedly because the level of impurities will not ordinarily be lowered sufficiently by one treatment. This can be done continuously as in a multistage batch process or by a continuous countercurrent process. In a continuous batch process the chlorinated hydrocarbon used in a later stage can, in customary fashion, be used as the extractant in a preceeding stage. A satisfactory product can be made by a single extraction with equal volumes of chloroform and calcium cyclohexylsulfamate solution. Similarly, a single extraction can be performed with other cyclohexylsulfamates depending upon the particular solvent and salt, and upon the purity desired.

The amount of the polychlorinated aliphatic hydrocarbons used in each extraction can be widely varied. In general, the volume of the chlorinated hydrocarbon will vary from, say, one-eighth to one-half times that of the volume of aqueous solution being treated. Notably smaller amounts will not ordinarily be used because too many extractions would then be required to obtain a desired low level of impurities. Again, larger amounts than those indicated will not ordinarily be used because it would involve the handling of more of the chlorinated hydrocarbon than is worth while.

After the extraction the cyclohexylsulfamate is of course present in aqueous solution. By traces of the solvent can be removed by distilling off a portion of the aqueous layer and the calcium cyclohexylsulfamate can be removed as by crystallization.

In order that the invention may be better understood reference should be had to the following illustrative example.

Example

The impure cyclohexylsulfamate to be treated was calcium cyclohexylsulfamate prepared by reacting cyclohexylamine with sulfamic acid and reacting the cyclohexylammonium cyclohexylsulfamate thus produced with calcium hydroxide. One thousand and forty parts by weight of an aqueous solution containing 353 parts by weight of the calcium cyclohexylsulfamic acid was adjusted from a pH of 11.35 to 6.9 with 6 N sulfuric acid (13.3 parts by weight). The temperature was maintained at 65° C. during the pH readjustment. Insoluble material was then filtered off.

The filtrate was held at a temperature of 50 to 53° C. and was extracted twice with chloroform. The volume of chloroform used in each extraction was one-half that of the volume of the aqueous system. The aqueous phase had a yellow-orange color and most of this was transferred to the chloroform extract.

The aqueous phase was concentrated under reduced pressure to remove remaining traces of chloroform. The residue of the solution, 1000 parts by weight, had a pH of 6.8. This was treated with 10 parts by weight of activated charcoal, Darco G–60, at 98° C. to remove the last traces of yellow color. The charcoal was filtered off and the residue washed with hot water.

The combined filtrate and washings, 918 parts by weight, were cooled to 25° C. with stirring to crystallize the calcium cyclohexylsulfamate. The product was separated and washed with water. It was then dried at 50° C. under atmospheric pressure.

One hundred and seventy-nine parts of dry calcium cyclohexylsulfamate was obtained as a pure, white crystalline product. The mother liquor and washings contained 158 parts of calcium cyclohexylsulfamate which was returned to the process for reworking. There was a handling loss of 16 parts by weight of calcium cyclohexylsulfamate.

The final product contained 18 parts per million of cyclohexylamine. A similar extraction was performed with chloroform at a pH of 10.5 to 11.5 and only 1.3 parts per million of cyclohexylamine was present in the final product.

We claim:

In a process for making a food quality calcium cyclohexylsulfamate, the step comprising extracting an aqueous solution containing from 30 to 50 percent by weight of an impure cyclohexylsulfamate with chloroform at a temperature of from 40 to 70° C. and removing the chloroform layer prior to crystallizing the cyclohexylsulfamate.

References Cited in the file of this patent
FOREIGN PATENTS 662,800   Great Britain _____ Dec. 12, 1951